Sept. 24, 1963  J. J. PRIMAS  3,105,176
DEVICE FOR THE GENERATION OF A STATIC AND
HOMOGENEOUS MAGNETIC FIELD
Filed May 1, 1961  4 Sheets-Sheet 3

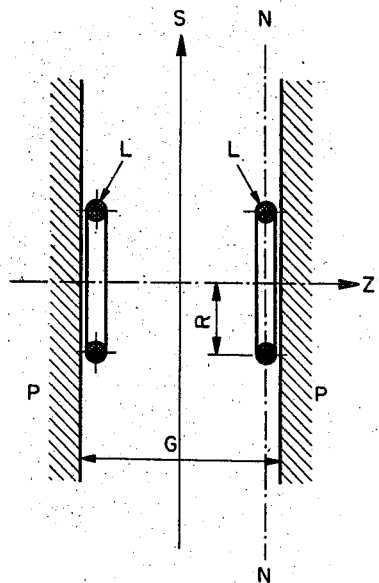
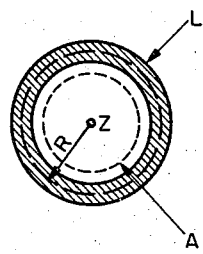
Fig.2
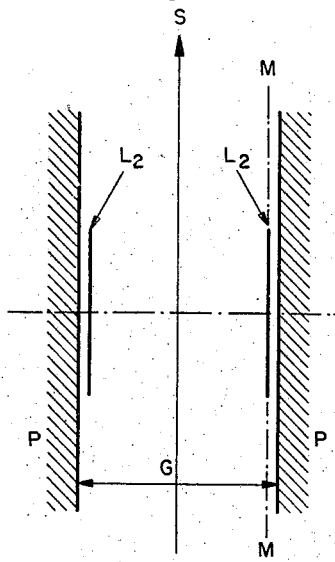
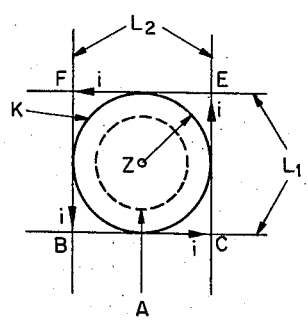
Fig.1
Fig.3   Fig.4

United States Patent Office 3,105,176
Patented Sept. 24, 1963

3,105,176
DEVICE FOR THE GENERATION OF A STATIC
AND HOMOGENEOUS MAGNETIC FIELD
Johann Jaroslav Primas, Zurich, Switzerland, assignor to
Trüb, Täuber & Co. AG, Zurich, Switzerland
Filed May 1, 1961, Ser. No. 106,605
Claims priority, application Switzerland May 2, 1960
9 Claims. (Cl. 317—158)

The present invention relates to a device for the generation of a static and homogeneous magnetic field.

Various physical experiments require static magnetic fields which exhibit a very high degree of homogeneity in a definite area. High-resolution core induction experiments for example involve the need for magnetic fields of a magnitude of several times ten thousand gauss, whereof the field strength varies no more than $10^{-7}$ to $10^{-9}$ times its mean value over a range extending between a cubic millimeter and a cubic centimeter.

Fields of this nature are as a rule generated by means of electromagnets or permanent magnets comprising axially symmetrical pole shoes, the axially symmetrical magnetic field between said pole shoes in known manner being homogeneous over the required range by means of axially symmetrical corrective units. These corrective units nowadays predominantly consist of a number of axially symmetrical current-traversed coils which are symmetrically and in pairs disposed within or about the air gap between the pole shoes, the currents flowing through said coils being so regulated, that the decrease in magnetic field strength towards the outside is counteracted within a certain range about the axis of symmetry.

A particularly simple and effective device of this nature, which operates with a single pair of coils only, is described in U.S. Patent 2,953,727. Said device is based on the fact, that according to experience, the field strength drops towards the outside from the axis of symmetry according to a purely quadratic law in the case of a magnet for which the ratio between pole shoe diameter and pole shoe spacing amounts to between 5 and 20. The device referred to accordingly comprises a pair of coils which also generates a purely quadratic corrective field within the required range. The second order inhomogeneities of the magnetic fields may in this manner be accurately counteracted without inhomogeneities of higher order being incurred thereby. The theory explicitly set forth in the patent application referred to demonstrates, that the condition required for a device of such nature is, that the two coils should lie in close proximity to the pole shoes, and that the diameter of each of the two coils should amount to 0.86 of the pole shoe spacing.

This device and other devices known hitherto are fully effective only if the uncorrected fields of the magnet is rigorously symmetrical in the axial sense at least in the range which is to be corrected. This condition is not however accurately fulfilled as a rule at present, in practice. Owing to the action of inhomogeneities in the material of the pole shoes as well as to geometrical effects, deviations from axial symmetry frequently occur in the magnetic field. These fields, whereof the equipotential lines as a rule in close approximation exhibit ellipses of small eccentricity, cannot be accurately corrected by means of axially symmetrical corrective coils. A correction by means of elliptical coils would be obvious, but the theory specifies a fixed coil diameter for the fixed pole shoe spacing, which does not apply in the case of an elliptical coil. A coil having an ellipticity coefficient adapted to the corresponding field would moreover have to be produced for every individual case. A solution of this nature would not however be applicable in practice, since the form of the field may vary in the course of time.

The present invention relates to a device for the generation of a static and homogeneous magnetic field between the pole pieces of a magnet, which device is also fully effective when deviations occur from axial symmetry in the magnetic field. According to the present invention, said device comprises two systems of two or more electrical conductors traversed by current, whereof each exhibit a rectilinearly extending part, all said rectilinear conductors in each system at least in approximation representing tangents to an imaginary circle, whereof the radius is at least approximately equal to 0.365 times the pole shoe spacing, said tangents of a system extending in parallel in pairs, the planes of the two systems being parallel to each other, and each being disposed in close proximity to one pole shoe. The invention moreover relates to a method for the operation of said device. Said method is essentially characterized by the fact, that the currents in each pair of parallel conductors are of equal magnitude and flow in opposite directions, that all currents in the symmetrical system run symmetrically to those in the first system, that the magnetic field generated by all said currents is oppositely directed to the field generated by said magnet, and that the current intensity in each pair of parallel conductors is selected to such purpose, that the inhomogeneity of the second order of the field is thereby accurately counteracted along the axis which lies within the plane of symmetry and at right angles to said pair of parallel conductors, without the simultaneous occurrence of higher order inhomogeneities along said axis.

The present invention furthermore relates to a processs for the production of the device according to claim 1, which is characterized by the fact, that printed circuits are utilized.

The present invention is hereinafter to be particularly described with reference to the accompanying drawings.

FIGURES 1 to 4 exemplify the manner of operation which is hereinafter explained.

FIGURE 1 shows a longitudinal section and FIGURE 2 a cross-section through a disposition according to U.S. Patent 2,953,727.

FIGURES 3 and 4 illustrate the corresponding sections taken through a disposition conformable to the present invention.

FIGURE 5–11 exemplify more generalized applications of the invention and special embodiments.

Figure 5:
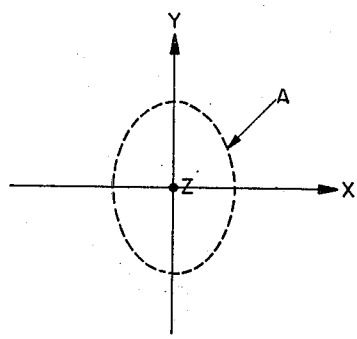

FIGURE 5 shows an equipotential line A of an elliptical field.

Figure 6:
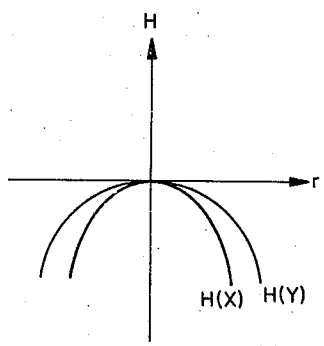

FIGURE 6 shows two diagrams of field strength H as a function of the distance r from the Z-axis.

Figure 7:
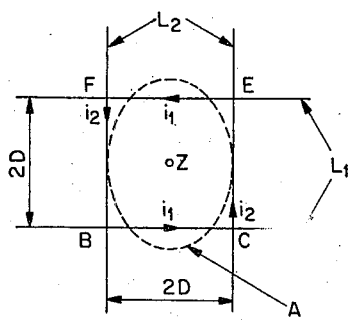

FIGURE 7 shows an embodiment for correction of elliptical fields.

Figure 8:
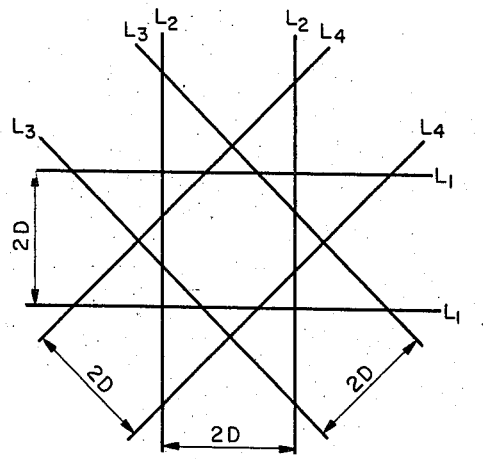

FIGURE 8 shows an embodiment for correction of fields with three different axes of quadratic course of the field strength.

Figure 9:
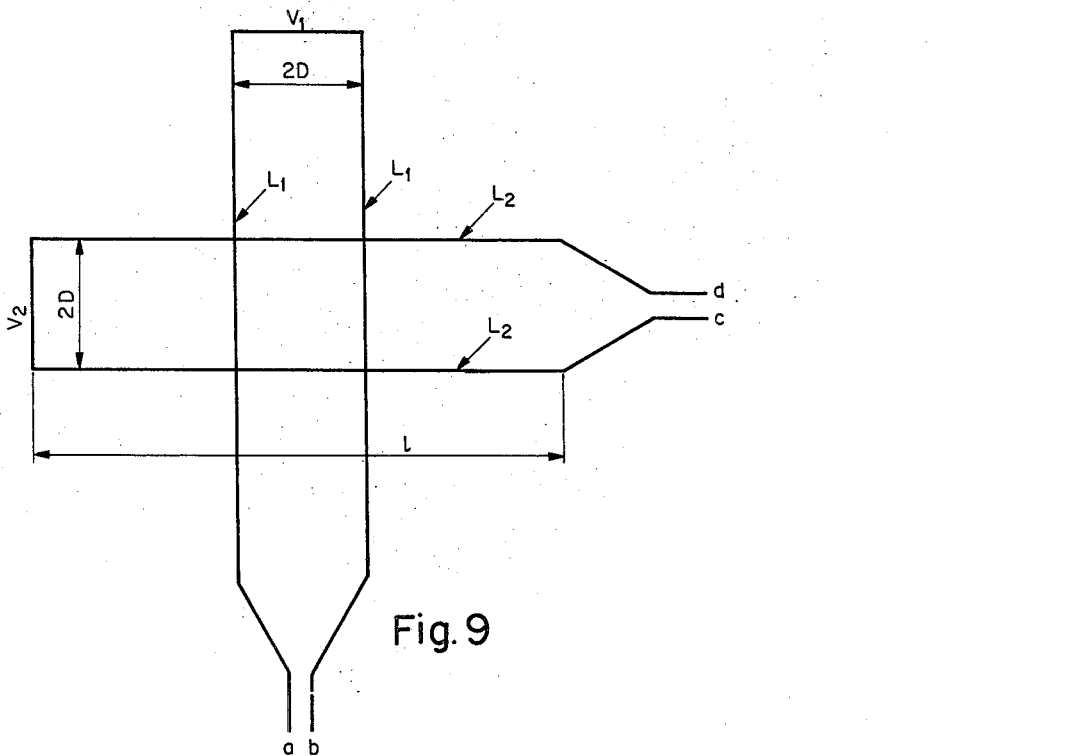

FIGURE 9 shows an embodiment with printed circuit.

Figure 10:
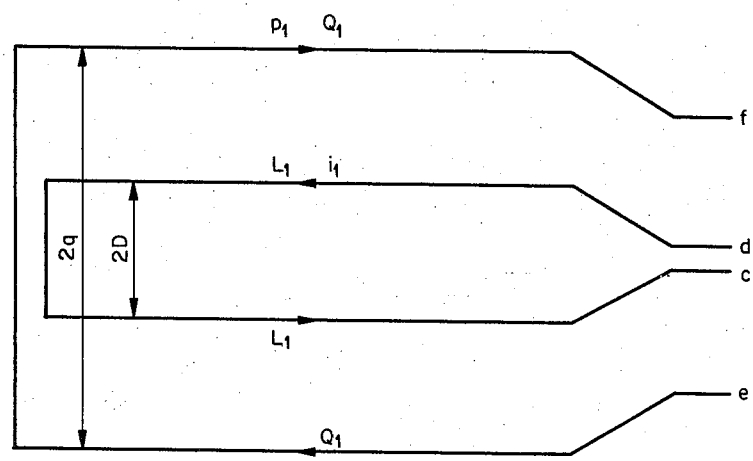

FIGURE 10 shows another embodiment with printed circuit including conductors for correcting the linear terms of the corrective field.

Figure 11:
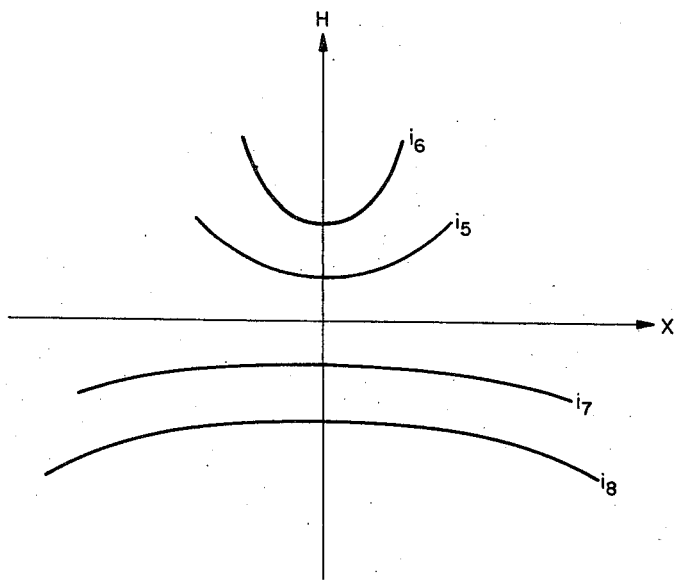

FIGURE 11 shows the field strength along the x-axis, produced by the device of FIGURE 10, with different currents $p_1$ and $i_1$.

In FIGURES 1 and 2, P designates the pole shoes of the magnet, G their spacing, L the round field correction coils, R the radius of the latter, Z the axis of rotation of the axially symmetrical field and also the center for the corrective coils, S the symmetry plane for the field and the corrective device, N—N the sectioning plane for FIGURE 2. An equipotential line of the field is drawn in FIGURE 2 beside the coils L having the radius R, said equipotential line being projected from the plane S on to the sectioning plane N—N.

U.S. Patent 2,953,727 provides an explicit mathematical theory demonstrating, that a disposition of this nature according to FIGURES 1 and 2 is suitable for the homogenization of axially symmetrical fields. Said theory states that in the case of coils L immediately adjacent to the pole shoes and for a ratio $R/G=0.43$, the field of said corrective coils may be represented by an exponential series whereof the fourth order term disappears. The corrective field thus essentially obeys a quadratic law. Since the field of the magnet essentially also follows a quadratic law, it is thus possible by means of an oppositely directed corrective field and of appropriate selection of the corrective current to counteract the second order inhimogeneity accurately within a definite area of the field, without the occurrence of a fourth order inhomogeneity. This disposition loses its effectiveness if the field of the magnet is not axially symmetrical.

In order to facilitate understanding of the disposition conformable to the present invention, a special form of embodiment thereof applicable to axially symmetrical fields is to be described initially.

FIGURE 3 shows a longitudinal section through a disposition of this nature, and FIGURE 4 a cross-section thereof. P designates the pole shoes, G their spacing, Z the axis of rotation, and S the symmetry plane for the field and device, $L_1$ and $L_2$ being electrical conductors, and M—M the sectioning plane for FIGURE 2. An axially symmetrical equipotential plane A is again projected on to said sectioning plane. The coil L of the disposition shown in FIGURE 2 is thus replaced in FIGURE 4 by the square BCEF comprising four linear conducting sections which are traversed by one and the same current $i$, $i$ flowing in a closed circuit.

On the basis of the same theoretical assumptions as in U.S. Patent 2,953,727, it is now possible to demonstrate mathematically, that this disposition also assures the correction of the second order inhomogeneities of the field of the magnet, without the generation of fourth order inhomogeneities, the applicable condition being, that the two squares should be adjacent to the pole shoes, and the ratio between the side BC of the square and the pole shoe spacing G should amount to 0.73.

This device may however be applied in much more generalized fashion, if the sides of said squares are considered separately. A cylindrical field obeying a quadratic rule may be corrected by means of two parallel portions of linear conductors which are traversed by the same current but in opposite directions. A fourth order inhomogeneity does not occur if the distance between said conductor amounts to 0.73 times the pole shoe spacing.

Assuming an optionally selected field which is axially symmetrical to the plane S and in this plane corresponds to a quadratic curve in one or more directions, may be envisaged as being composed of several such cylindrical fields. If two pairs of linear conducting sections whereof the spacing amounts to 0.73 times the pole shoe spacing are now symmetrically disposed adjacent to the pole shoes, each of said pairs being so aligned, that it corrects one cylindrical field, the second order inhomogeneity of the field can be counteracted in this general case, without the occurrence of a fourth order inhomogeneity. In this case, the field of the magnet is not axially symmetrical therefore and the pairs of parallel conducting sections must neither extend at right angles to each other, nor must they conjointly enclose a regular polygon, all that is necessary is, that each pair should have the spacing 0.73G and that all the angle bisectors of all pairs should pass through one point. This condition may be formulated in a simpler manner, if one envisages a circle A having the radius 0.365G, as drawn in FIGURE 4. All pairs of conductors must then represent tangents to this imaginary circle. Two symmetrical systems of rectilinear conductive portions disposed in two parallel planes are obtained in this manner, each of said systems being adjacent to a pole shoe. Only the portions of the conductors within the said systems are of interest, whereby the total length of the rectilinear portions of the conductors should be at least three times the diameter of the said circle. Beyond this system, the course of the conductors is not prescripted, but should be plotted in a manner not to perturb the field produced by the conductors within the system. The practical embodiment, which excludes a contact between the different conducting portions, naturally means that each system may only approximately lie in one plane.

The currents may differ in the different pairs of conductors, the currents in one and the same pair of conductors must however be identical and oppositely directed, as well as identical to the current in the symmetrically disposed pair of conductors which is adjacent to the other pole shoe. The currents in the two systems thus also flow symmetrically. The directions of the currents should be selected in such manner, that the corrective field is oppositely directed to the field of the magnet.

A first embodiment of the present invention relates to elliptical fields, which represents the most general case in practice. FIGURE 5 shows an equipotential line A of such an elliptical field, the long axis extending in the $y$ direction and the short axis in the $x$ direction. Z represents the direction at right angles to the symmetry plane $xy$. The curve representing the field strength of a field of this type is reproduced in FIGURE 6 as a function of the field strength A corresponding to the distance $r$ from the Z axis, measured in the symmetry plane $xy$. The trace follows an approximately quadratic law along the $x$ axis ($H(x)$) as well as along the $y$ axis ($H(y)$), but $H(x)$ diminishes more rapidly towards the outside than $H(y)$. The homogenization according to the present invention of a field of this type is successfully accomplished by means of a device according to FIGURE 7, wherein only four rectilinear conductive portions $L_1$, $L_2$ are present in each system, which jointly form an approximate square BCEF. The side of the latter must then be equal to 0.73 times the pole shoe spacing. This device produces the homogenization according to the present invention of elliptical fields, if the sides of the square lie parallel to the axes of the field ellipse in FIGURE 5 and if the currents $i_1$ and $i_2$ are selected in such manner, that the second order inhomogeneity is accurately counteracted in the $x$ and $y$ directions.

The first form of embodiment described may also be utilized where the field of the magnet is a purely cylindrical field in the area or space in question. One of the two current intensities $i_1$ or $i_2$ then becomes nought. A hyperbolic field may also be homogeneous according to the present invention with the aid of this form of embodiment. The equipotential curves are then hyperbolae. The four currents along the sides of the square then no longer flow in a closed circuit, but one of the pairs of currents $i_1$ or $i_2$ must flow in the opposite direction to that illustrated in FIGURE 7. The magnetic field generated by all four currents is nevertheless opposed to the field generated by the magnet. The sides of the square are again positioned parallel to the axes of the field and the current intensities $i_1$ and $i_2$ are selected in such manner, that the second order inhomogeneity of the field is accurately counteracted along each axis. These axes lie in the symmetry plane of the device and vertical to the parallel pairs of conductors $L_1$ and $L_2$.

If the form of the field is not purely elliptical, or if the diminution of the field along the axes does not precisely obey a quadratic equation, additional corrective pairs of conductors may be fitted, which are most conveniently disposed diagonally to the first two pairs of conductors, as shown in FIGURE 8. This second form of embodiment is thus characterized by the fact, that each of said systems comprises eight rectilinear conductive portions which jointly form an approximation of a regular octagon, the radius of the circle inscribed within said octagon measuring 0.365 times the spacing between the pole shoes. The axes of a field frequently do not continuously exhibit the same direction, since not only the ellipticity of the field itself for example, but also its direction, may vary in the course of time. It should in view of this fact be possible also to vary the orientation of the homogenization device. If the neutral point Z of the field is also displaced, it should also be possible to displace the neutral point of the device accordingly, in order to allow the second order inhomogeneities of the field to be accurately counteracted along the axes.

A form of application of the method for the operation of the device therefore makes provision for the device to be disposed between the pole shoes in such manner as to be displaceable in two directions. This displaceability will be adequate, if the device possesses a sufficient number of pairs of conductors. If on the contrary, too few pairs of conductors are available, a rotation of the device will be required in addition, in order to set the pairs of conductors of the device vertically to the axes of the field.

A further form of application of the method according to the present invention is therefore characterized by the fact, that the device is rotatable between the pole shoes about an axis extending at right angles to the symmetry plane.

The two systems of pairs of conductors should according to the present invention be at least approximately adjacent to the pole shoes. Since the pairs of conductors may not however, touch each other, this precludes the utilization of any but the flattest possible conductors. A useful process for the construction of the device is therefore based on the utilization of printed circuits for the production of the pairs of conductors.

A corresponding form of embodiment is shown in FIGURE 9. The pair of conductors $L_1$—$L_1$, conjointly with the connection $v_1$ and the connecting conductors $a$ and $b$, forms a printed circuit. The permanent connection $v_1$ is justified by the fact, that the currents in the pair of conductors are always of the same magnitude and flow in opposed direction to each other.

An additional embodiment is obtained when the insulating plate carrying the printed circuit carries a second printed circuit on its rear side, this second printed circuit consisting of a second pair of conductors $L_2$, $v_2$, $c$, $d$.

A troublesome characteristic of the device described resides in the fact, that when the corrective current is varied in the pairs of conductors, this alters not only the shape of the field, but also the field strength itself in the neutral point $z$. The right corrective current for homogenization according to the present invention in a pair of conductors is to lie between $i_5$ and $i_6$ as shown in FIG. 11. The corrective current will now be varied until a homogeneous field is measured (e.g. by means of the nuclear magnetic resonance method. The height of the entire curve however varies in doing so, and in order to continue measurement, the total field strength must again be tuned to the core induction signal.

This may be avoided if one succeeds in opposing to the quadratic corrective field a homogeneous field whereof the magnitude precisely corresponds to the magnitude of the linear term of the corrective field. A close aprpoximation to this result is attained by means of a form of embodiment according to FIGURE 10.

This form of embodiment is characterized by the fact, that a second parallel pair of conducting sections $Q_1$ is disposed in association with the first pair of parallel conducting sections $L_1$ whereof the spacing $2D \cong 0.73G$, said second pair being disposed in the same plane and symmetrically to the pair of conductors $L_1$, and the spacing $2q$ between these second conducting sections $Q_1$ being substantially greater than the spacing $2D$ between the first pair.

In order to achieve the intended result by means of these additional pairs of conductors, the current $p_1$ in these pairs of conductors must also be identical and must have the direction shown in the drawing, as well as being proportional to the current $i_1$. The magnitude of the proportionality factor depends on the spacing $2q$. The proportionality factor in the embodiment of FIGURE 10 must be adjusted such that the current $p_1$ induces, as shown in FIGURE 11, field strengths $i_7$ and $i_5$, respectively, opposing field strengths $i_8$ and $i_6$, induced by the current $i_1$, result in a total field strength at the intersection of the X and H axes, of FIGURE 11, which is substantially equal to zero. The process is therefore charcterized by the fact, that the identical current flows in each conducting portion of the second pair of conducting portions referred to, that the intensity of this current is proportional to that in the first pair of conductors, and that the currents in every two neighboring and parallel conducting portions have the opposite directions. The factor relating to the proportionality referred to is selected in such manner, that the field strength of the corrective field does not change along the axis of symmetry of the four conducting portions when both current intensities are varied proportionally.

I claim:

1. A device for the generation of a static and homogeneous magnetic field between the parallel parts of the pole shoes of a magnet, characterized by the fact, that it comprises two systems of two or more electrical conductors through which current flows, whereof each exhibits a rectilinearly extending part, all said rectilinear conductors in each system representing at least approximate tangents to an imaginary circle, whereof the radius at least approximately equals 0.365 times the pole shoe spacing, said tangents of a system extending parallel in pairs, the planes of the two systems being parallel to each other and each being at least approximately adjacent to one pole shoe.

2. The invention defined in claim 1, characterized by the fact, that each of said systems comprises a pair of parallel conductors, the currents in the respective conductors of each pair being of identical strength and being oppositely directed relative to each other, that all currents in one of said systems flow symmetrically relative to those flowing in the other of said systems, that the magnetic field generated by all said currents is opposed in direction to the field generated by said magnet, and that the current intensity in each pair of parallel conductors is selected in such manner, that the second order inhomogeneity of the field is accurately counteracted along the axes which lie in the symmetry plane and extend at right angles, respectively, to said pairs of parallel conductors, without the occurrence of inhomogeneities of higher orders along said axes.

3. Device according to claim 1, characterized by the fact, that each of said systems comprises four rectilinear conducting portions which jointly form an approximate square whereof the side measures 0.73 times the spacing between the pole shoes in length.

4. Device according to claim 1, characterized by the fact, that each of said systems comprises eight rectilinear conducting portions which jointly form an approximate regular octagon, the radius of the circle inscribed within said octagon measuring 0.365 times the spacing between the pole shoes.

5. The invention defined in claim 1, wherein said device further includes adjustable mounting means, whereby said device is disposed between the pole shoes in such manner as to be displaceable in two directions.

6. The invention defined in claim 1, wherein said device further includes rotary mounting means positioned such that said device is rotatable between the pole shoes about an axis extending at right angles to the symmetry plane.

7. Device according to claim 1, characterized by the fact, that a second pair of conducting units parallel to each other is associated with each pair of parallel conducting units in the same plane and symmetrically to said pair of conductors, the spacing between the conducting units of the second pair being substantially greater than that between those of the first pair.

8. The invention defined in claim 1, wherein each of said two systems comprise a printed circuit.

9. The invention defined in claim 1, wherein said two systems comprise a printed circuit means including a common circuit board, said systems, respectively, being on opposite sides of said common circuit board.

No references cited.